No. 750,292. Patented January 26, 1904.

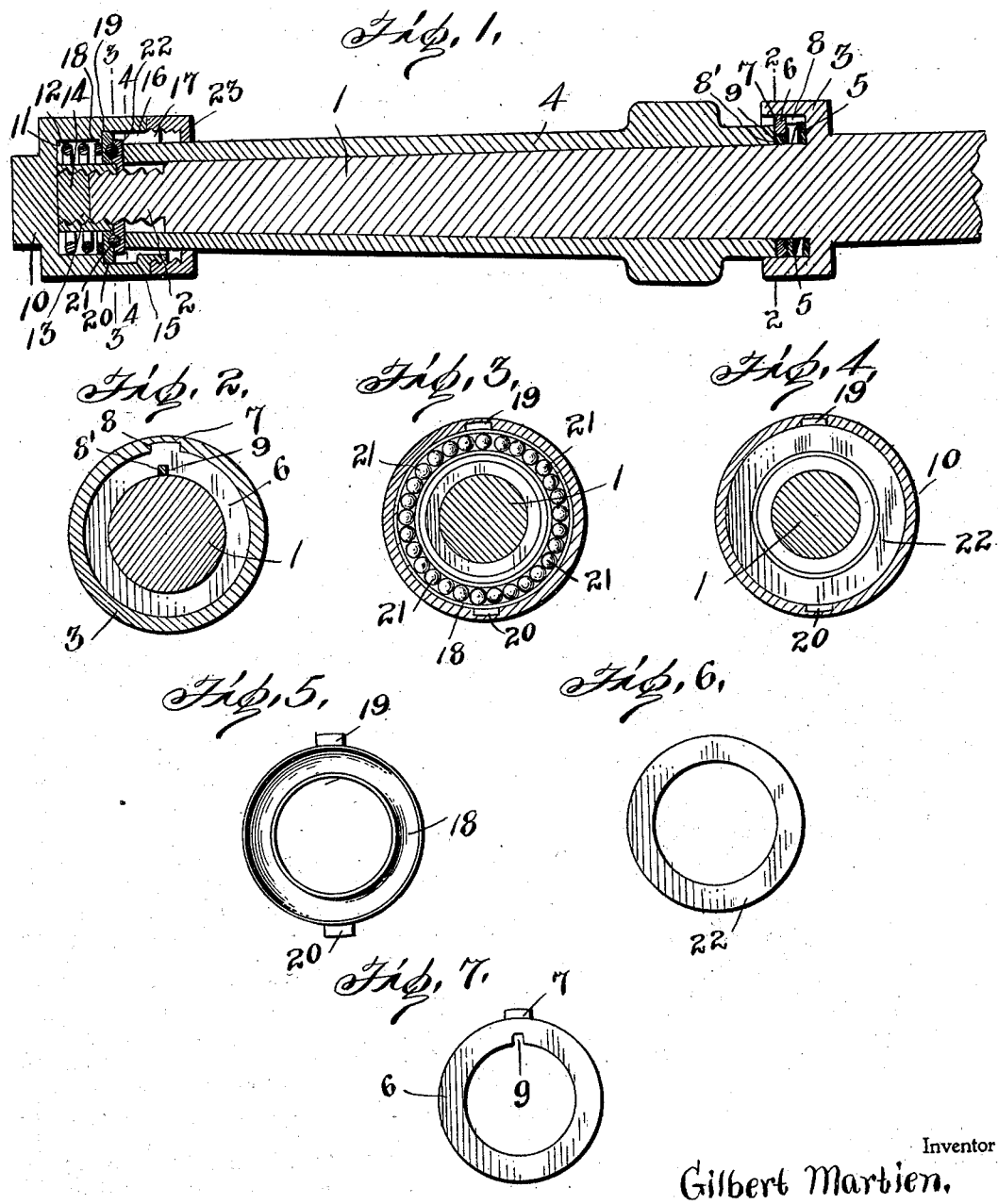

UNITED STATES PATENT OFFICE.

GILBERT MARTIEN, OF MANSFIELD, OHIO.

AXLE BOX AND SPINDLE.

SPECIFICATION forming part of Letters Patent No. 750,292, dated January 26, 1904.

Application filed June 9, 1903. Serial No. 160,695. (No model.)

*To all whom it may concern:*

Be it known that I, GILBERT MARTIEN, a citizen of the United States, residing at Mansfield, in the county of Richland and State of Ohio, have invented certain new and useful Improvements in Axle Boxes and Spindles; and I do declare the following to be a full, clear, and exact description of the invention, such as will enable others skilled in the art to which it appertains to make and use the same.

This invention relates to axle boxes and spindles, and particularly to improvements in cap-nuts and spring-washers for vehicle-spindles for maintaining a dust-proof connection between the parts and compensate for the wear thereof and prevent endwise movement of the wheel on the spindle.

The object of the invention is to provide improved devices of this character; and it consists in the peculiar construction and combination and arrangement of parts hereinafter described and claimed.

In the accompanying drawings, Figure 1 is a sectional view through an axle box and spindle embodying my improvements. Fig. 2 is a cross-sectional view through the spindle and box on the line 2 2 of Fig. 1. Figs. 3 and 4 are similar views through the axle-spindle and cap-nut on the lines 3 3 and 4 4 of Fig. 1. Figs. 5 and 6 are detail views of the spring-washer devices of the cap-nut, and Fig. 7 is a detail view of the spring-washer 6.

Referring now more particularly to the drawings, the numeral 1 represents an axle-spindle having an outer threaded end 2 and provided at its inner end with a collar 3, and 4 is the axle-box, which turns upon the spindle. The collar 3 is recessed upon its outer side to form a chamber, in which is disposed a spiral spring 5, bearing upon a washer 6, which engages the inner end of the box 4. As shown, the washer 6 is held from rotation by a lug 7, formed thereon and engaging a notch 8 in the wall of the chamber, while one end of the spring 5 is positively connected to the washer and is similarly held from movement by an angularly-bent end 8' thereon, which engages a notch 9, formed in the washer adjacent to the lug 7. By this construction it will be seen that the washer 6 is pressed outward by the spring 5 and maintained in contact with the inner end of the box 4, so as to take up the inward endwise play of the latter and prevent undue inward motion thereof from wear.

The cap-nut 10 is provided with an outer annular recess 11 to receive a coil-spring 12 and is further provided with an inner annular recess 13, internally threaded to receive the threaded end 2 of the spindle 1. A screw-plug 14 is disposed within the said recess 13 and is adjustable therein to vary the depth of said recess to suit threaded spindle ends 2 of different lengths and to also regulate the depth of said socket to vary the tension of the spring 12. The wall of the cap-nut 10 is provided at diametrically opposite sides with a niche or recess 15, closed at its outer end, and with a niche or recess 16, terminating at its outer end in a slot or notch 17. A washer 18 is disposed within the nut between the inner end thereof and the recess 13 and is pressed inward by a spring 12. This washer is provided with projecting lugs 19 and 20, which enter the said recesses or grooves 15 and 16 and hold the washer from rotation, while permitting it to slide freely longitudinally of the spindle under the pressure of the axle-box and spring 12. The outer face of the washer 18 is grooved to receive a series of bearing-balls 21, and coacting with said washer 18 is a second washer 22, whose inner face is grooved to receive said balls and to form with the first-named washer a raceway in which the balls are adapted to travel. The washer 22 is adapted to turn or rotate on the balls 21 and is pressed outward by the spring 12 into contact with the outer end of the axle-box 4. A collar 23 screws upon the inner end of the cap-nut and limits the inward movement of the washer. It will thus be observed that the washers 18 and 22 are adapted to bear against the outer ends of the axle-box and compensate for the wear thereof, thus preventing the same from having undue outward longitudinal movement, while the spring-washer 6, on the other hand, prevents the box from having undue inward longitudinal movement.

From the foregoing description, taken in connection with the accompanying drawings, the construction and operation of my invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. The combination with a cap-nut, of a washer endwise movable longitudinally therein, and comprising members one adapted to rotate upon the other and to bear upon the hub, antifriction-bearings between said members, and a spring bearing against said members for the purpose set forth.

2. A cap-nut, having a spring-pressed washer to bear against the outer end of the hub on a spindle, said washer comprising a longitudinally-movable non-rotatable member, a rotatable member, the latter bearing on the hub, and antifriction-bearings between the two members.

3. A cap-nut, a spring-pressed washer disposed therein and comprising a member held from rotation within the nut, a second member adapted to bear against the vehicle-box, antifriction-bearings between the two members, and a spring acting on the washers.

4. A cap-nut having grooves therein, a spring-pressed washer comprising a member having projections entering said grooves to hold it against rotation, a second member adapted to bear against a vehicle-box, ball-bearings between the two members, and a spring acting on the washer.

5. The combination of an axle-spindle having a threaded end, a cap-nut having a threaded socket receiving said threaded end and having a chamber outside said socket, an axle-box disposed upon said spindle and having its outer end entering the cap-nut in line with said outer chamber, a collar mounted upon the inner end of the cap-nut and encompassing the outer end of the axle-box so as to inclose the same within the cap-nut, a spring in said outer chamber, and a washer acted upon by said spring, said washer comprising two members one laterally movable within the cap-nut but held from rotation and engaged by the spring, and the other rotatably mounted within the cap-nut and bearing upon the end of the axle-box, and antifriction-bearings between the said members of the washer.

In testimony whereof I have hereunto set my hand in presence of two subscribing witnesses.

GILBERT MARTIEN.

Witnesses:
WILBERT J. BISSMAN,
SAML. MARRIOTT.